United States Patent
Michoud et al.

(10) Patent No.: US 10,864,774 B2
(45) Date of Patent: Dec. 15, 2020

(54) RUBBER COMPOSITE REINFORCED BY AT LEAST ONE STEEL REINFORCING ELEMENT RENDERED ADHESIVE BY AN ADHESIVE COMPOSITION CONTAINING AROMATIC ALDEHYDE AND POLYPHENOL

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Clément Michoud, Clermont-Ferrand (FR); David Doisneau, Clermont-Ferrand (FR)

(73) Assignee: Compagnie Generale Des Etablissements Michelin, Clermont Ferrand (FR)

( * ) Notice: Subject to any disclaimer, the term of this patent is extended or adjusted under 35 U.S.C. 154(b) by 391 days.

(21) Appl. No.: 15/117,036

(22) PCT Filed: Feb. 5, 2015

(86) PCT No.: PCT/EP2015/052361
§ 371 (c)(1),
(2) Date: Aug. 5, 2016

(87) PCT Pub. No.: WO2015/118042
PCT Pub. Date: Aug. 13, 2015

(65) Prior Publication Data
US 2017/0166010 A1 Jun. 15, 2017

(30) Foreign Application Priority Data
Feb. 6, 2014 (FR) ..................... 14 50902

(51) Int. Cl.
*B32B 7/12* (2006.01)
*B60C 7/00* (2006.01)
(Continued)

(52) U.S. Cl.
CPC ............. *B60C 9/0007* (2013.01); *B32B 7/12* (2013.01); *B32B 15/06* (2013.01); *C08J 5/12* (2013.01);
(Continued)

(58) Field of Classification Search
CPC .......... B60C 9/0007; B60C 2009/0021; B60C 2009/0014; C08J 5/12; B32B 7/12;
(Continued)

(56) References Cited

U.S. PATENT DOCUMENTS

| 2,343,551 A | 3/1944 | Harkins | ........................... 260/3 |
| 3,411,980 A | 11/1968 | Leshin | |

(Continued)

FOREIGN PATENT DOCUMENTS

| CN | 102718934 A | 10/2012 |
| CN | 102875754 A | 1/2013 |

(Continued)

OTHER PUBLICATIONS

Y.Y. Su, et al., "The Role of Oxide Structure on Copper Wire to the Rubber Adhesion", Applied Surface Science, vol. 161, pp. 355-364 (2000).

(Continued)

*Primary Examiner* — Jessica M Roswell
(74) *Attorney, Agent, or Firm* — Venable LLP

(57) ABSTRACT

The rubber composite comprises a steel reinforcing element coated with an adhesive layer coating at least a portion of the reinforcing element. The adhesive layer comprises an adhesive composition comprising at least one phenol/aldehyde resin based on at least: one aromatic aldehyde and one (Continued)

polyphenol comprising one or more aromatic nucleus/nuclei. The coated steel reinforcing element is embedded in a rubber matrix based on a rubber composition comprising a crosslinking system comprising a content of molecular sulphur ranging from 1 to 5 phr.

21 Claims, 1 Drawing Sheet

(51) Int. Cl.
 *C08J 5/12* (2006.01)
 *B60C 9/00* (2006.01)
 *B32B 15/06* (2006.01)

(52) U.S. Cl.
 CPC ....... *B32B 2255/06* (2013.01); *B32B 2255/26* (2013.01); *B32B 2405/00* (2013.01); *B32B 2605/08* (2013.01); *B60C 2009/0014* (2013.01); *B60C 2009/0021* (2013.01)

(58) Field of Classification Search
 CPC . B32B 15/06; B32B 2405/00; B32B 2255/26; B32B 2255/06; B32B 2605/08
 See application file for complete search history.

(56) References Cited

U.S. PATENT DOCUMENTS

| | | | | |
|---|---|---|---|---|
| 5,535,612 | A | 7/1996 | Vijayakar | 72/43 |
| 5,852,099 | A | 12/1998 | Vanel | 524/494 |
| 6,418,994 | B1 | 7/2002 | Arnaud et al. | 152/556 |
| 6,420,488 | B1 | 7/2002 | Penot | 525/332.7 |
| 6,536,492 | B2 | 3/2003 | Vasseur | 152/450 |
| 7,066,228 | B2* | 6/2006 | Grimberg | B60C 1/00 152/151 |
| 7,217,751 | B2 | 5/2007 | Durel et al. | 524/262 |
| 8,247,490 | B1* | 8/2012 | Li | C09J 109/02 524/510 |
| 9,145,494 | B2 | 9/2015 | Veyland et al. | |
| 9,840,644 | B2 | 12/2017 | Doisneau et al. | |
| 2001/0034389 | A1 | 10/2001 | Vasseur | 524/137 |
| 2003/0111153 | A1* | 6/2003 | Kim | B60C 9/0007 152/540 |
| 2004/0132880 | A1 | 7/2004 | Durel et al. | 524/262 |
| 2010/0170624 | A1 | 7/2010 | Hollinger et al. | 156/117 |
| 2011/0111219 | A1 | 5/2011 | Abe et al. | 428/344 |
| 2012/0211139 | A1 | 8/2012 | Li | 152/537 |
| 2012/0283372 | A1 | 11/2012 | Veyland et al. | |
| 2014/0235124 | A1 | 8/2014 | Doisneau et al. | 442/149 |
| 2014/0235125 | A1 | 8/2014 | Doisneau et al. | 442/149 |
| 2014/0308864 | A1 | 10/2014 | Doisneau et al. | 442/149 |
| 2016/0024353 | A1 | 1/2016 | Doisneau | C09J 161/06 |
| 2016/0251550 | A1 | 9/2016 | Michoud et al. | C09J 107/02 |
| 2017/0165942 | A1 | 6/2017 | Michoud et al. | |
| 2017/0166011 | A1 | 6/2017 | Michoud et al. | |
| 2017/0174006 | A1 | 6/2017 | Michoud et al. | |

FOREIGN PATENT DOCUMENTS

| | | |
|---|---|---|
| EP | 0 501 227 A1 | 9/1992 |
| EP | 0 648 891 A1 | 4/1995 |
| EP | 0 735 088 A1 | 10/1996 |
| EP | 2 006 341 A2 | 12/2008 |
| GB | 1 466 114 | 3/1977 |
| JP | 56-47470 A | 4/1981 |
| JP | 2000-219938 A | 8/2000 |
| WO | 99/02583 | 1/1999 |
| WO | 00/05300 | 2/2000 |
| WO | 00/05301 | 2/2000 |
| WO | 02/083782 A1 | 10/2002 |
| WO | 2012/112240 A1 | 8/2012 |
| WO | 2013/017422 A1 | 2/2013 |
| WO | 2013/017423 A1 | 2/2013 |

OTHER PUBLICATIONS

W. J. Van Ooij, "Mechanism and Theories of Rubber Adhesion to Steel Tire Cords—An Overview", Rubber Chemistry and Technology, vol. 57, pp. 421-456 (1983).

* cited by examiner

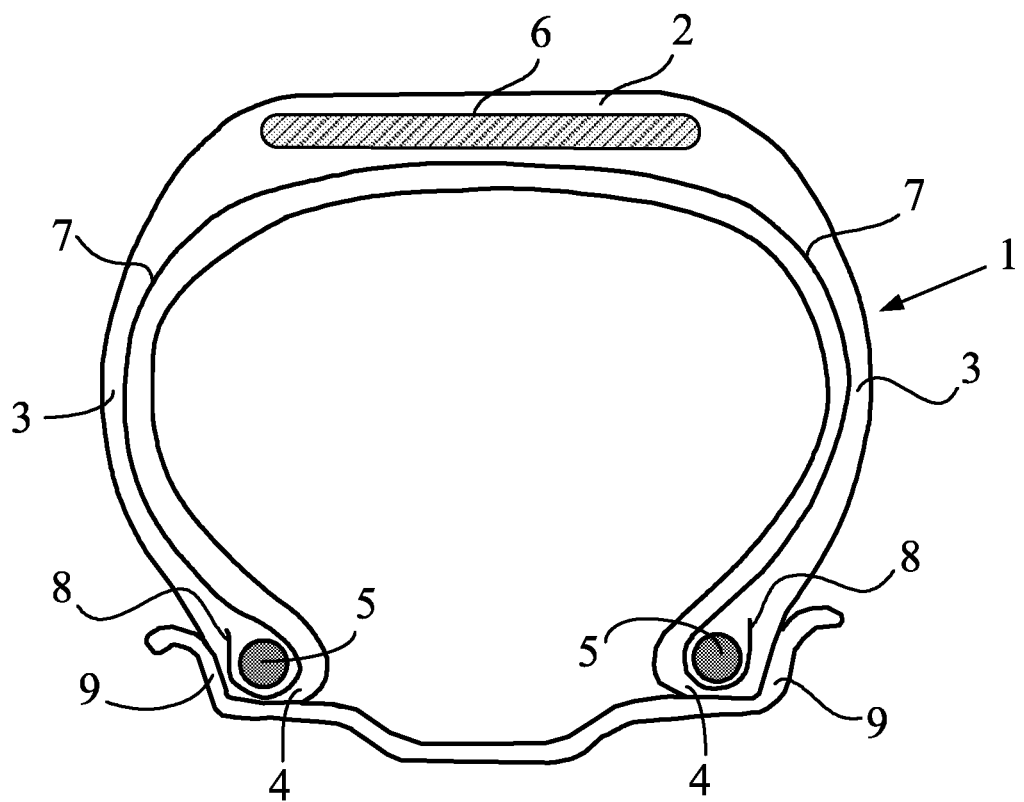

RUBBER COMPOSITE REINFORCED BY AT LEAST ONE STEEL REINFORCING ELEMENT RENDERED ADHESIVE BY AN ADHESIVE COMPOSITION CONTAINING AROMATIC ALDEHYDE AND POLYPHENOL

FIELD OF THE INVENTION

The field of the present invention is that of metal reinforcing elements and adhesive compositions or "adhesives" intended to make such metal reinforcing elements adhere to unsaturated rubber matrices, such as those commonly used in rubber articles or semi-finished products.

RELATED ART

The present invention relates more particularly to rubber composites reinforced by steel reinforcing elements coated with adhesive layers based on a phenol/aldehyde resin, in particular to tyres reinforced by such rubber composites.

Steel reinforcing elements for tyres comprising one or more threadlike reinforcing elements made of steel, for example steel wires, are known from the state of the art.

A first solution for making these steel wires adhere to rubber compositions is to use adhesives known under the name "RFL" (for resorcinol-formaldehyde latex), such as, for example, in EP 2 006 341. These RFL adhesives comprise, in a well-known way, a thermosetting phenolic resin, obtained by the condensation of resorcinol with formaldehyde, and one or more latexes of diene rubber in aqueous solution.

The RFL adhesives of EP 2 006 341 ensure good adhesion of the coated steel wire or wires to rubber matrices without these wires being surface-treated, that is to say in the absence of a layer of a metal coating, for example a layer of brass. However, the RFL adhesive requires the use of a halogenated polymer and of a metal oxide. In addition, this RFL adhesive requires the use of a rubber matrix comprising an acrylic rubber composition and thus does not make possible satisfactory adhesion with any rubber matrix.

A second solution for making these steel wires adhere to rubber compositions is to coat the steel reinforcing elements with a layer of brass. This second solution is the most widespread and the most effective industrial solution. During the curing of the tyre, an adhesive interface is formed which comprises zinc oxide, zinc sulphide and copper sulphide resulting from the reaction between the brass and the rubber composition. Such an interface and the corresponding physicochemical mechanisms are described in particular in the paper "Mechanism and theories of rubber adhesion to steel cords—An overview", W. J. Van Ooij, Rubber Chemistry and Technology, 421-456, Vol. 57. However, it is necessary, in particular for the formation of copper sulphide and zinc sulphide, to have available a rubber matrix based on a rubber composition comprising a crosslinking system comprising a high content of molecular sulphur of between 6 and 12 phr. However, such a rubber matrix exhibits, due to the high content of molecular sulphur, a limited shelf life because of the risks of pre-vulcanization of the rubber composition at ambient temperature.

Thus, the designers of rubber articles, in particular tyre manufacturers, have the objective today of finding novel simple adhesive systems which make it possible to make metal reinforcing elements adhere satisfactorily to rubber matrices, without the latter necessarily being based on an acrylic rubber composition or without having to use the adhesive in combination with a halogenated polymer and a metal oxide. In addition, it is desirable to be able to have available a rubber matrix exhibiting a shelf life which is as long as possible.

In point of fact, during their research studies, the Applicant Companies have discovered an adhesive composition which makes it possible to meet the above objective.

BRIEF DESCRIPTION OF EMBODIMENTS OF THE INVENTION

Thus, a first subject-matter of the invention is a rubber composite reinforced with at least one steel reinforcing element coated at least in part with an adhesive layer, the reinforced rubber composite comprising a rubber matrix in which the coated steel reinforcing element is embedded, the adhesive layer comprising an adhesive composition comprising at least one phenol/aldehyde resin based on at least:
  one aromatic aldehyde bearing at least one aldehyde functional group, comprising at least one aromatic nucleus;
  one polyphenol comprising one or more aromatic nucleus/nuclei, it being understood that:
    in the case of just one aromatic nucleus, the latter bears two or three hydroxyl functional groups in the meta position with respect to each other or with respect to one another, the remainder of the aromatic nucleus being unsubstituted;
    in the case of several aromatic nuclei, at least two of them each bear two or three hydroxyl functional groups in the meta position with respect to each other or with respect to one another, it being understood that the two positions ortho to at least one of these hydroxyl functional groups are unsubstituted,
the rubber matrix being based on a rubber composition comprising a crosslinking system comprising a content of molecular sulphur ranging from 1 to 5 phr.

The invention also relates to a process for the manufacture of a rubber composite reinforced with at least one steel reinforcing element coated at least in part with an adhesive layer comprising an adhesive composition as described above. The process according to the invention comprises a stage in which the steel reinforcing element coated at least in part with the adhesive layer is embedded in a rubber matrix based on a rubber composition comprising a crosslinking system comprising a content of molecular sulphur ranging from 1 to 5 phr.

In addition, the invention relates to the use, for the calendering of a steel reinforcing element coated at least in part with an adhesive layer comprising an adhesive composition as described above, of a rubber matrix based on a rubber composition comprising a crosslinking system comprising a content of molecular sulphur ranging from 1 to 5 phr.

Another subject-matter of the invention is a tyre comprising at least one rubber composite as described above.

The invention thus relates to any rubber composite (article or semi-finished product), in particular any tyre, before and after curing (for final crosslinking or vulcanization), comprising a coated steel reinforcing element as described above.

The invention also relates to the use of a rubber composite as described above in tyres, in particular those intended to equip motor vehicles of passenger type, SUVs ("Sport Utility Vehicles"), two-wheel vehicles (in particular bicycles and motorcycles), aircraft, as for industrial vehicles chosen from vans, heavy-duty vehicles, that is to say, underground trains, buses, heavy road transport vehicles (lorries, tractors, trailers) or off-road vehicles, such as heavy agricultural vehicles or earthmoving equipment, or other transportation or handling vehicles.

DETAILED DESCRIPTION

The invention and its advantages will be easily understood in the light of the description and implementational examples which follow.

In the present description, unless expressly indicated otherwise, all the percentages (%) shown are % by weight.

"Diene" elastomer (or, without distinction, rubber) is understood to mean an elastomer resulting at least in part (that is to say, a homopolymer or a copolymer) from diene monomer(s) (i.e., monomers bearing two conjugated or non-conjugated carbon-carbon double bonds). "Isoprene elastomer" is understood to mean an isoprene homopolymer or copolymer, in other words a diene elastomer selected from the group consisting of natural rubber (NR), synthetic polyisoprenes (IRs), various isoprene copolymers and the mixtures of these elastomers.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

I—Rubber Composite

The expression "composition based on" should, of course, be understood as meaning a composition comprising the mixture and/or the reaction product of the various base constituents used for this composition, it being possible for some of them to be intended to react or capable of reacting with one another or with their immediate chemical surroundings, at least partly, during the various phases of manufacture of the composition, of the reinforcing element or of the composites or finished articles, in particular during a curing stage.

Usually, for the crosslinking of rubber compositions, a crosslinking system comprising molecular sulphur is used. "Molecular sulphur" is understood to mean sulphur resulting from an $S_n$ compound with n>2. Molecular sulphur is usually added to the crosslinking system at a content of between 6 and 12 phr. In the invention, the crosslinking system comprises a content of molecular sulphur ranging from 1 to 5 phr. An amount of molecular sulphur, not part of the crosslinking system, is potentially present in the rubber composition, it being possible for this molecular sulphur to originate from the other components of the composition, introduced in the "non-productive" phase of the preparation (see section II below). For example, it can in particular originate from the carbon black. In the rubber composition of the composite according to the invention, the content of molecular sulphur in the composition ranges from 3 to 7 phr.

Advantageously, the content of molecular sulphur of the crosslinking system of the rubber composition is less than or equal to 4 phr, preferably less than or equal to 3 phr and more preferably less than or equal to 2.5 phr.

Advantageously, the content of molecular sulphur of the crosslinking system of the rubber composition is greater than or equal to 1.5 phr, preferably greater than or equal to 2 phr.

Preferably, the rubber composition comprises at least one diene elastomer.

The diene elastomer of the composite is preferably selected from the group consisting of polybutadienes (BRs), natural rubber (NR), synthetic polyisoprenes (IRs), butadiene/styrene copolymers (SBRs), isoprene/butadiene copolymers (BIRs), isoprene/styrene copolymers (SIRs), butadiene/styrene/isoprene copolymers (SBIRs) and the mixtures of these elastomers.

The rubber composition can also comprise all or part of the additives normally used in rubber matrices intended for the manufacture of tyres, such as, for example, reinforcing fillers, such as carbon black or silica, coupling agents, antiageing agents, antioxidants, plasticizing agents or extending oils, whether the latter are aromatic or nonaromatic in nature (in particular very slightly aromatic or nonaromatic oils, for example of the naphthenic or paraffinic type, with a high or preferably with a low viscosity, MES or TDAE oils), plasticizing resins having a high Tg of greater than 300° C., agents which facilitate the processing (processability) of the compositions in the raw state, tackifying resins, antireversion agents, methylene acceptors and donors, such as, for example, HMT (hexamethylenetetramine) or H3M (hexamethoxymethylmelamine), reinforcing resins (such as resorcinol or bismaleimide), known adhesion-promoting systems of the metal salt type, for example, in particular cobalt, nickel or lanthanide salts, or a crosslinking or vulcanization system.

Preferably, the crosslinking system is a "vulcanization" system, that is to say a system based on molecular sulphur and on a primary vulcanization accelerator. Various known secondary vulcanization accelerators or vulcanization activators, and also retarders, can be added to this base vulcanization system. The primary accelerator, for example a sulphenamide, is used at a preferred content ranging from 0.5 to 10 phr. The composition can also comprise a retarder, used at a preferred content ranging from 0.1 to 3 phr. The combined vulcanization accelerators, retarders and activators are used at a preferred content ranging from 0.5 to 15 phr.

The content of reinforcing filler, for example carbon black or silica, is preferably greater than 50 phr, in particular between 50 and 150 phr. All carbon blacks, in particular blacks of the HAF, ISAF or SAF type, conventionally used in tyres ("tyre-grade" blacks) are suitable as carbon blacks. Mention will more particularly be made, among the latter, of carbon blacks of (ASTM) grade 300, 600 or 700 (for example, N326, N330, N347, N375, N683 or N772). Precipitated or fumed silicas exhibiting a BET specific surface of less than 450 $m^2/g$, preferably from 30 to 400 $m^2/g$, are suitable in particular as silicas.

A person skilled in the art will know, in the light of the present description, how to adjust the formulation of the rubber composition in order to achieve the desired levels of properties (in particular elastic modulus) and to adapt the formulation to the specific application envisaged.

The coated steel reinforcing element can comprise, in one embodiment, a single threadlike reinforcing element. In another embodiment, the coated steel reinforcing element comprises several threadlike reinforcing elements assembled together, for example by braiding or twisting. Mention will be made, among the coated steel reinforcing elements comprising several threadlike reinforcing elements, for example, of layered cords and multistrand cords. Each threadlike reinforcing element is unitary, that is to say that the constituents of each threadlike reinforcing element are inseparable from one another.

The term "threadlike reinforcing element" is understood to mean the elongate elements of great length relative to their cross section, whatever the shape, for example circular, oblong, rectangular or square, or even flat, of the latter, it being possible for this threadlike element to be straight or not straight, for example twisted or wavy. When it is circular in shape, the diameter of each threadlike reinforcing element is preferably less than 5 mm, more preferably within a range extending from 0.1 to 0.5 mm. Mention will also be made of the strips or bands which exhibit a great length with respect to their thickness.

The adhesive layer coats at least a portion of the or each threadlike reinforcing element. Thus, the adhesive layer can partially or completely coat the or each threadlike reinforcing element. Thus, in the embodiment in which the coated steel reinforcing element comprises a single threadlike reinforcing element, the adhesive layer can coat some portions of this element or else the whole of it. In the embodiment in which the coated steel reinforcing element comprises several threadlike reinforcing elements, the adhesive layer can coat several threadlike elements without coating others of them, or else can coat solely certain portions of some or all of the threadlike elements.

In a preferred embodiment, the coated steel reinforcing element comprises one or more threadlike reinforcing elements, each comprising a steel core. The steel core is monolithic, that is to say that it is, for example, made as one piece or moulded.

The steel can exhibit a perlitic, ferritic, austenitic, bainitic or martensitic microstructure or a microstructure resulting from a mixture of these microstructures.

Preferably, the steel comprises a carbon content ranging from 0.2% to 1% by weight and more preferably from 0.3% to 0.7% by weight. Preferably, the steel comprises a manganese content ranging from 0.3% to 0.7% by weight, a silicon content ranging from 0.1% to 0.3% by weight, a phosphorus content ranging at most up to 0.045%, limit included, by weight, a sulphur content ranging at most up to 0.045%, limit included, by weight and a nitrogen content ranging at most up to 0.008%, limit included, by weight. Optionally, the steel comprises at most 0.1%, limit included, preferably 0.05%, limit included, and more preferably 0.02%, limit included, by weight of vanadium and/or molybdenum.

In one embodiment, the steel used comprises less than 0.5%, preferably at most 0.05%, limit included, and more preferably at most 0.02%, limit included, by weight of chromium.

In another embodiment using "stainless" steel, the steel comprises at least 0.5%, limit included, preferably at least 5%, limit included, and more preferably at least 15%, limit included, by weight of chromium.

Preferably, a stainless steel comprises at least 2%, limit included, preferably at least 4%, limit included, and more preferably at least 6% by weight of nickel.

In one embodiment, the adhesive layer directly coats at least a portion of the steel core of the or each threadlike reinforcing element. Thus, in this embodiment, the coated reinforcing element is devoid of nonmetallic intermediate layer and of layer of a metal coating which would be inserted between the steel of the core of the or each threadlike reinforcing element and the adhesive layer comprising the adhesive composition.

In another embodiment, the adhesive layer directly coats a layer of a metal coating directly coating at least a portion of the steel core of the or each threadlike reinforcing element. The metal of the layer of the metal coating is made of a metal other than steel.

Preferably, the metal of the layer of the metal coating directly coating at least a portion of the steel core of the or each threadlike reinforcing element is chosen from zinc, copper, tin and the alloys of these metals. Mention will be made, as examples of alloys of these metals, of brass and bronze.

In another embodiment, the adhesive layer directly coats a nonmetallic intermediate adhesive layer coating at least a portion of the steel core of the or each threadlike reinforcing element. In an alternative form of this embodiment, the nonmetallic intermediate adhesive layer directly coats at least a portion of the steel core of the or each threadlike reinforcing element. In another alternative form of this embodiment, the nonmetallic intermediate adhesive layer directly coats at least a portion of the layer of the metal coating directly coating at least a portion of the steel core of the or each threadlike reinforcing element. The nonmetallic intermediate layer, generally known as adhesion primer, makes it possible, in combination with the adhesive layer comprising the adhesive composition, to improve the adhesion of the coated steel reinforcing element to the rubber matrix. Such adhesion primers are those commonly used by a person skilled in the art for the presizing of certain textile fibres (polyester, for example PET, aramid or aramid/nylon fibres). For example, use could be made of an epoxy-based primer, in particular a primer based on polyglycerol polyglycidyl ether. Use could also be made of a primer based on blocked isocyanate.

Layer "directly" coating an object or coating "directly" coating an object is understood to mean that the layer or the coating is in contact with the object without any other object, in particular another layer or another coating, being interposed between the two.

The adhesive composition thus comprises at least one (that is to say, one or more) phenol/aldehyde resin based on at least one (that is to say, one or more) aromatic aldehyde and at least one (that is to say, one or more) polyphenol, which constituents will be described in detail below.

I.1—Aromatic Aldehyde

The first constituent of the phenol/aldehyde resin is an aromatic aldehyde bearing at least one aldehyde functional group, comprising at least one aromatic nucleus.

According to a preferred embodiment, the aromatic nucleus bears the aldehyde functional group.

Preferably, the aromatic aldehyde bears at least two aldehyde functional groups. Preferably, the aromatic nucleus of the aromatic aldehyde bears two aldehyde functional groups, it being possible for the latter to be in the ortho, meta or para position on the aromatic nucleus.

Preferably, the aromatic nucleus of the aromatic aldehyde is a benzene nucleus. In some embodiments, this aromatic aldehyde is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and the mixtures of these compounds.

More preferably still, the aromatic polyaldehyde used is 1,4-benzenedicarboxaldehyde, also called terephthaldehyde, as a reminder of expanded chemical formula:

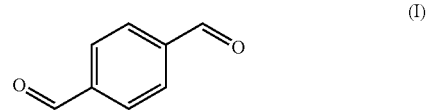

(I)

In other embodiments, the aromatic aldehyde exhibits the formula (A):

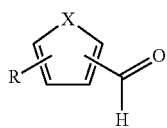
(A)

in which X comprises N, S or O and R represents —H or —CHO.

Such aromatic aldehydes result from renewable resources and not from oil. The aromatic aldehydes result, for example, from biobased resources or from products of the transformation of biobased sources.

Preferably, the aromatic aldehyde is of general formula (A'):

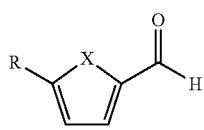
(A')

According to a preferred embodiment, X represents O.

In an alternative form of the aromatic aldehyde of general formula (A), X represents O and R represents —H. The aromatic aldehyde used is then of formula (B1):

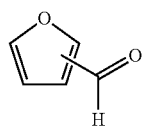
(B1)

In an alternative form of the aromatic aldehyde of general formula (A'), X represents O and R represents —H. The aromatic aldehyde used is then furfuraldehyde and is of formula (B'1):

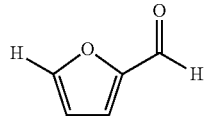
(B'1)

In another alternative form of the aromatic aldehyde of general formula (A'), X represents O and R represents —CHO. The aromatic aldehyde used is then of formula (B2):

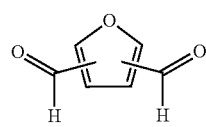
(B2)

In another alternative form of the aromatic aldehyde of general formula (A'), X represents O and R represents —CHO. The aromatic aldehyde used is then 2,5-furandicarboxaldehyde and is of formula (B'2):

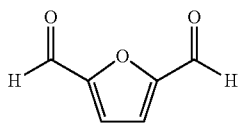
(B'2)

In another embodiment, X comprises N.

In an alternative form of the aromatic aldehyde of general formula (A), X represents NH. The aromatic aldehyde used is of formula (C1):

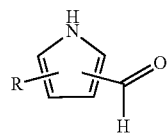
(C1)

In an alternative form of the aromatic aldehyde of general formula (A'), X represents NH. The aromatic aldehyde used is of formula (C'1):

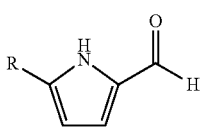
(C'1)

Preferably, R represents —CHO in the alternative form of the aromatic aldehyde of formula (C'1) and the aromatic aldehyde obtained is then 2,5-1H-pyrroledicarboxaldehyde.

In another alternative form of the aromatic aldehyde of general formula (A), X represents NR1 with R1 representing an alkyl, aryl, arylalkyl, alkylaryl or cycloalkyl group. The aromatic aldehyde used is of formula (C2):

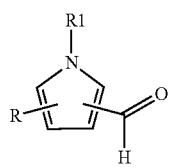
(C2)

In another embodiment, X comprises S.

In an alternative form of the aromatic aldehyde of general formula (A), X represents S. The aromatic aldehyde used is of formula (D1):

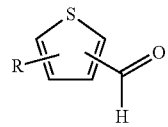
(D1)

In an alternative form of the aromatic aldehyde of general formula (A'), X represents S. The aromatic aldehyde used is of formula (D'1):

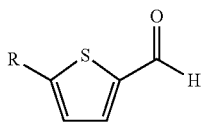

(D'1)

Preferably, R represents —CHO in the alternative form of the aromatic aldehyde of formula (D'1) and is then 2,5-thiophenedicarboxaldehyde.

In another alternative form of the aromatic aldehyde of general formula (A), X represents SR2 with R2 representing an alkyl, aryl, arylalkyl, alkylaryl or cycloalkyl group. The aromatic aldehyde used is of formula (D2):

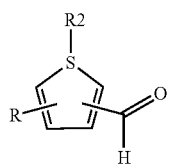

(D2)

In yet another alternative form of the aromatic aldehyde of general formula (A), X represents R3-S—R2 with R2 and R3 representing, each independently of one another, an alkyl, aryl, arylalkyl, alkylaryl or cycloalkyl group. The aromatic aldehyde used is of formula (D3):

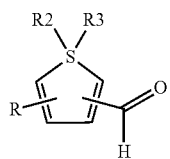

(D3)

In yet another alternative form of the aromatic aldehyde of general formula (A), X represents S=O. The aromatic aldehyde used is of formula (D4):

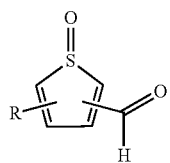

(D4)

In yet another alternative form of the aromatic aldehyde of general formula (A), X represents O=S=O. The aromatic aldehyde used is of formula (D5):

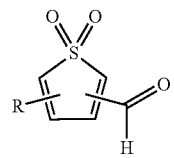

(D5)

Among the different embodiments described above, preference will be given to the embodiments and alternative forms in which X represents NH, S or O. In these embodiments and alternative forms, it will be possible to have R representing —H or —CHO and preferably R representing —CHO. In these embodiments and alternative forms, R will preferably be in the 5 position and the —CHO group will preferably be in the 2 position on the aromatic nucleus (general formula (A')).

The phenol/aldehyde resin could comprise a mixture of the compounds indicated above, in particular a mixture of furfuraldehyde and 2,5-furandicarboxaldehyde.

Preferably, when the phenol/aldehyde resin is based on a single aromatic aldehyde, the composition is devoid of formaldehyde.

When the phenol/aldehyde resin is based on several aldehydes, at least one of which is an aromatic aldehyde, each aldehyde is preferably different from formaldehyde. The composition is then also preferably devoid of formaldehyde.

In other words and preferably, the or each aldehyde of the phenol/aldehyde resin is different from formaldehyde.

"Devoid of formaldehyde" is understood to mean that the content by weight of formaldehyde, by total weight of the aldehyde or aldehydes, is strictly less than 1%.

In some embodiments, the composition can comprise formaldehyde. Preferably, the composition then comprises a content by weight of formaldehyde, by total weight of the aldehyde or aldehydes, of less than or equal to 10%, preferably of less than or equal to 5% and more preferably of less than or equal to 2%.

I.2—Polyphenol

The second constituent of the phenol/aldehyde resin is a polyphenol comprising one or more aromatic nucleus/nuclei.

In the case of a polyphenol comprising just one aromatic nucleus, the latter bears two or three hydroxyl functional groups in the meta position with respect to each other (in the case of two functional groups) or with respect to one another (in the case of three functional groups), the remainder of the aromatic nucleus being by definition unsubstituted; this is understood to mean that the other carbon atoms of the remainder of the aromatic nucleus (those other than the carbon atoms bearing hydroxyl functional groups) bear a simple hydrogen atom.

Mention may in particular be made, as preferred example of polyphenol comprising just one aromatic nucleus, of resorcinol, as a reminder of expanded formula:

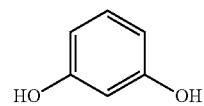

(II)

Mention may be made, as even more preferred example comprising just one aromatic nucleus, of phloroglucinol, as a reminder of expanded formula:

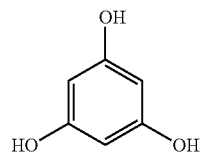
(III)

In the case of a polyphenol comprising several (two or more than two) aromatic nuclei, at least two of them each bear two or three hydroxyl functional groups in the meta position with respect to each other (in the case of two functional groups) or with respect to one another (in the case of three functional groups), it being understood that the two positions ortho to at least one of these hydroxyl functional groups are unsubstituted; this is understood to mean that the two carbon atoms located on either side of (in the ortho position to) the hydroxylated carbon atom (i.e., bearing the hydroxyl functional group) bear a simple hydrogen atom.

As preferred examples, in the case where the polyphenol molecule comprises several aromatic nuclei, at least two of these aromatic nuclei, which are identical or different, are selected from those of general formulae:

(IV-a)

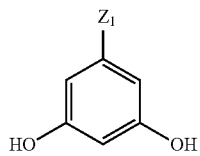
(IV-b)

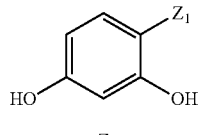
(IV-c)

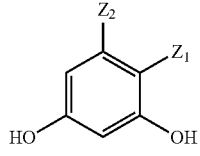
(IV-d)

in which the $Z_1$ and $Z_2$ symbols, which are identical or different, if they are several on the same aromatic nucleus, represent an atom (for example, carbon, sulphur or oxygen) or a connecting group, by definition at least divalent, which connects at least these two aromatic nuclei to the remainder of the polyphenol molecule.

According to a specific and preferred embodiment of the invention, the polyphenol is, for example, a flavonoid, characterized, as a reminder, by a structure based on 15 carbon atoms, formed by two benzene rings connected via three carbon atoms. More particularly, the flavonoid used is 2',4',3,5,7-pentahydroxyflavone, also called "morin", of formula (V) below:

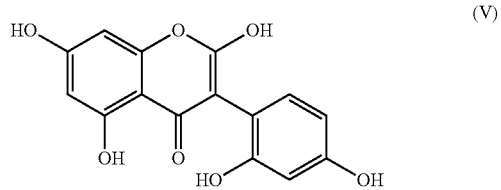 [SMILES: O=c1c(-c2ccc(O)cc2O)c(O)oc2cc(O)cc(O)c12]
(V)

It is noted that this compound is a polyphenol comprising two aromatic nuclei (of respective formulae IV-c and IV-d above), each of which indeed bears two hydroxyl functional groups in the meta position with respect to each other, the two positions ortho to at least one of these two hydroxyl functional groups being unsubstituted.

According to another specific and preferred embodiment of the invention, the polyphenol is, for example, phloroglucide, also called 2,4,6,3',5'-biphenylpentol, of following expanded formula:

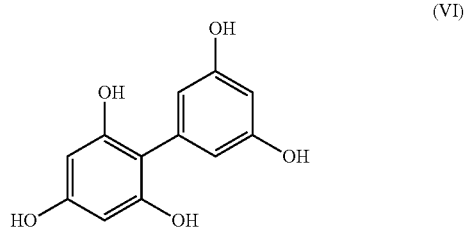 [SMILES: Oc1cc(O)cc(-c2c(O)cc(O)cc2O)c1]
(VI)

It is noted that this compound is a polyphenol comprising two aromatic nuclei (of respective formulae IV-a and IV-b above), each of which indeed bears at least two (in the case in point, one bears two and the other bears three) hydroxyl functional groups in the meta position with respect to each other, the two positions ortho to at least one of these two hydroxyl functional groups being unsubstituted.

According to yet another specific and preferred embodiment of the invention, the polyphenol

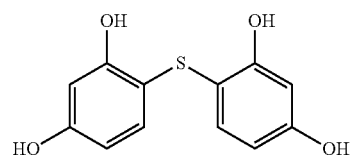
(VII)

is, for example, 2,2',4,4'-tetrahydroxydiphenyl sulphide, of following expanded formula:

In a preferred embodiment, the polyphenol is selected from the group consisting of phloroglucinol (III), 2,2',4,4'-tetrahydroxydiphenyl sulphide (VII) and the mixtures of these compounds.

I.3—Unsaturated Elastomer Latex

It should be remembered that a latex is a stable dispersion of microparticles of elastomer(s) in suspension in an aqueous solution.

Unsaturated (that is to say, bearing carbon-carbon double bonds) elastomer latexes, in particular diene elastomer latexes, are well-known to a person skilled in the art.

Preferably, the adhesive composition comprises an unsaturated elastomer latex. The unsaturated elastomer of the latex is preferably a diene elastomer, more preferably a diene elastomer selected from the group consisting of polybutadienes, butadiene copolymers, polyisoprenes, isoprene copolymers and the mixtures of these elastomers. It is more preferably still selected from the group consisting of butadiene copolymers, vinylpyridine/styrene/butadiene terpolymers, natural rubber and the mixtures of these elastomers.

I.4—Additives—Manufacture of the Adhesive Composition

The adhesive composition and/or its phenol/aldehyde resin and/or its starting unsaturated elastomer latex can, of course, comprise all or some of the additives normal for adhesive compositions, such as those used in conventional RFL adhesives; mention will be made, for example, of bases, such as aqueous ammonia, sodium hydroxide, potassium hydroxide or ammonium hydroxide, colourants, fillers, such as carbon black or silica, antioxidants or other stabilizers.

Typically, during a first manufacturing stage, the resin itself is prepared by gradually mixing the polyphenol and the aromatic aldehyde in a basic solvent, such as an aqueous sodium hydroxide solution, preferably having a pH of between 9 and 13, more preferably between 10 and 12. The combined constituents are mixed with stirring for a time which can vary according to the temperature used and the specific composition targeted, for example for a period of time which can vary between 1 min and 6 h, at a temperature of between 15° C. and 90° C., preferably between 20° C. and 60° C.

The phenol/aldehyde resin, thus pre-condensed, is generally diluted in water so as to obtain an aqueous adhesive composition. A latex or latexes (if there are several) of unsaturated elastomer(s) is/are then added, in order to form the aqueous adhesive composition, according to a general procedure which is well-known to a person skilled in the art in the field of RFL adhesives.

For example, the constituents of the adhesive composition are added in the following order: the water, possible water-soluble additives (for example aqueous ammonia), the latex or latexes (any order) and the phenol/aldehyde resin (diluted). The combination is mixed with stirring for 1 to 30 min, for example at 23° C.

During a final manufacturing stage, the adhesive composition is generally stored at ambient temperature (23° C.) for a maturing time which can typically vary from 1 to several hours, indeed even several days, before it is finally used.

In the final adhesive composition thus prepared, the content of phenol/aldehyde resin as dry matter preferably represents between 5% and 60% by weight, more preferably between 10% and 30% by weight, of the adhesive composition dry matter.

For its part, the content of unsaturated elastomer (that is to say, the dry matter of the latex or latexes) is preferably between 40% and 95% by weight, more preferably between 70% and 90% by weight, of the dry matter of the adhesive composition.

The ratio by weight of polyphenol to aromatic aldehyde is preferably between 0.1 and 3, more preferably between 0.25 and 2.

The ratio by weight of the resin dry matter to the latex dry matter is preferably between 0.1 and 2.0, more preferably between 0.15 and 1.0.

The water content of the adhesive composition is preferably between 60% and 90%, more preferably between 60% and 85%.

Advantageously, the adhesive composition comprises a gelatin. The gelatin makes it possible to slow down the dewetting of the threadlike reinforcing elements and thus to ensure better adhesion between the steel reinforcing element and the rubber matrix. "Gelatin" is understood to mean any mixture of proteins comprising products from the total or partial hydrolysis of collagen.

II—Process for the Manufacture of the Rubber Composite

During the process described above, at least a portion of the steel reinforcing element is coated with the adhesive layer comprising the adhesive composition described above.

Prior to the stage of coating the steel reinforcing element with the adhesive layer comprising the adhesive composition, each threadlike reinforcing element can be subjected to treatment stages, for example stages of descaling, of wet or dry drawing or also of heat treatment. Examples of these treatment stages are described in particular in the documents US20100170624, U.S. Pat. No. 5,535,612 or JP2000219938.

The coating stage can be carried out according to any appropriate method, in particular by any known coating technique, such as, for example, spraying, impregnation by dipping, forward progression in a bath or other equivalent technique for the deposition of a thin or ultra-thin film of composition, or also by a combination of one or more of these techniques.

The weight of dry matter of the adhesive composition deposited on one kilogram of uncoated threadlike steel reinforcing element is preferably between 2 and 100 g, more preferably between 2 and 50 g and more preferably still between 3 and 15 g.

After the stage, described above, of coating the steel reinforcing element with the adhesive composition, the coated steel reinforcing element is subjected to a first heat treatment, targeted at removing any solvent or water, at a temperature of preferably between 110° C. and 260° C., more preferably between 130° C. and 250° C., for example by passing through a tunnel oven, typically with a length of several metres, such as those commonly used for the heat treatment after sizing of textile materials with an RFL adhesive.

The anhydrous coated steel reinforcing element thus obtained is then subjected to a second heat treatment in order to terminate the crosslinking of the adhesive composition, preferably carried out in air in a tunnel oven as described above. The treatment temperature is preferably between 150° C. and 350° C. The treatment times are from a few seconds to a few minutes, according to the circumstances (for example, between 10 s and 10 min).

A person skilled in the art will know how to adjust, if appropriate, the temperature and the duration of the heat treatment above, depending on the specific conditions for implementation of the invention, in particular on the exact nature of the adhesive composition or on the nature of the steel. In particular, a person skilled in the art will have the advantage of scanning the treatment temperatures and times so as to search, by successive approximations, for the operating conditions giving the best adhesion results, for each specific embodiment of the invention.

The thickness of the layer consisting of the adhesive composition coating each threadlike reinforcing element is within an interval of values ranging from 5 to 100 μm, preferably from 5 to 50 μm and more preferably from 10 to 35 μm.

The rubber composition is prepared separately. The composition is manufactured in appropriate mixers, using two successive phases of preparation which are well known to a person skilled in the art: a first phase of thermomechanical working or kneading (sometimes referred to as "non-productive" phase) at high temperature, up to a maximum temperature (denoted Tmax) of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in the abovementioned documents EP 501 227, EP 735 088, WO00/05300, WO00/05301 or WO02/083782.

By way of example, the first (non-productive) phase is carried out in a single thermomechanical stage during which, in a first step, all the base constituents (diene elastomer, reinforcing inorganic filler and optional coupling agents) are introduced into an appropriate mixer, such as a standard internal mixer, followed, in a second step, for example after kneading for one to two minutes, by the optional additional covering agents or processing aids and various other additives, with the exception of the crosslinking system; when the bulk density of the reinforcing inorganic filler is low (general case of the silicas), it can be advantageous to introduce it divided into two or more parts. A second stage of thermomechanical working can be added to this internal mixer, after dropping the mixture and intermediate cooling (cooling temperature preferably of less than 100° C.), with the aim of subjecting the compositions to an additional thermomechanical treatment, in particular in order to further improve the dispersion, in the elastomeric matrix, of the reinforcing inorganic filler and of its optional coupling agents. The total duration of the kneading, in this non-productive phase, is preferably between 2 and 10 minutes.

After cooling the mixture thus obtained, the crosslinking system is then incorporated at low temperature, generally in an external mixer, such as an open mill; the combined mixture is then mixed (productive phase) for a few minutes, for example between 5 and 15 minutes.

Then, during a subsequent stage, the coated steel reinforcing element is embedded in a rubber matrix based on the rubber composition described above.

It will be possible to carry out the stage, during which the steel reinforcing element coated with the adhesive composition is embedded in the rubber matrix, preferably by calendering several coated steel reinforcing elements between two bands of the rubber matrix. However, other processes known to a person skilled in the art can be employed.

Subsequent to the stage during which the steel reinforcing element coated with the adhesive composition is embedded in the rubber matrix, crosslinking is carried out by curing, preferably under pressure, the composite thus formed. The crosslinking is carried out in a known way at a temperature generally of between 130° C. and 200° C., preferably under pressure, for a sufficient time which can vary as a function in particular of the curing temperature, of the crosslinking system adopted, of the kinetics of crosslinking of the composition under consideration or of the size of the tyre.

The invention thus applies to any type of rubber composite capable of being obtained by the process described above, comprising at least a rubber matrix, in particular a diene elastomer matrix, bonded to the steel reinforcing element via an adhesive interphase based on the adhesive composition.

III—Tyre

The composite described above can advantageously be used to reinforce tyres for all types of vehicles, in particular passenger vehicles or industrial vehicles, such as heavy-duty vehicles.

By way of example, the single appended FIGURE represents very diagrammatically (without observing a specific scale) a radial section of a tyre in accordance with the invention for a vehicle of the heavy-duty type.

This tyre 1 comprises a crown 2 reinforced by a crown reinforcement or belt 6, two sidewalls 3 and two beads 4, each of these beads 4 being reinforced with a bead thread 5. The crown 2 is surmounted by a tread, not represented in this diagrammatic FIGURE. A carcass reinforcement 7 is wound around the two bead threads 5 in each bead 4, the turn-up 8 of this reinforcement 7 being, for example, positioned towards the outside of the tyre 1, which is here represented fitted onto its wheel rim 9. The carcass reinforcement 7 is, in a way known per se, composed of at least one ply reinforced by "radial" cords, for example of metal, that is to say that these cords are positioned virtually parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 6).

This tyre 1 of the invention has, for example, the characteristic that at least a crown reinforcement 6 and/or its carcass reinforcement 7 comprises a composite according to the invention. According to another possible implementational example of the invention, it is, for example, the bead threads 5 which might be composed, in all or in part, of a coated steel reinforcing element, thus forming a composite according to the invention.

Of course, the invention relates to the objects described above, namely the rubber composite, such as tyre, comprising it, both in the raw state (before curing or vulcanization) and in the cured state (after curing).

IV—Implementational Examples of the Invention and Comparative Tests

Several adhesive compositions, denoted C-1.1 to C-1.7 below, were prepared as indicated above. Their formulations (expressed as percentage by weight) are presented in the appended Table 1. The amounts listed in this table are those of the constituents in the dry state, with respect to a total of 100 parts by weight of adhesive composition (that is to say, the constituents plus the water).

Each adhesive composition C-1.1 to C-1.7 is based on an aromatic aldehyde, the nucleus of which bears two aldehyde functional groups.

The aldehydes of the compositions C-1.1 to C-1.6 are selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and the mixtures of these compounds. In the case in point, the aldehyde is selected from the group consisting of 1,2-benzenedicarboxaldehyde, 1,3-benzenedicarboxaldehyde and 1,4-benzenedicarboxaldehyde.

The aldehyde of the composition C-1.7 is selected from the group consisting of furfuraldehyde, 2,5-furandicarboxaldehyde and the mixtures of these compounds. In the case in point, the aldehyde is 2,5-furandicarboxaldehyde.

The polyphenols of the compositions C-1.1 to C-1.7 comprise one or more aromatic nucleus/nuclei, it being understood that:

in the case of just one aromatic nucleus (case of phloroglucinol and resorcinol), the latter bears two or three hydroxyl functional groups in the meta position with respect to each other or with respect to one another, the remainder of the aromatic nucleus being unsubstituted;

in the case of several aromatic nuclei (case of 2,2',4, 4'-tetrahydroxydiphenyl sulphide, of phloroglucide and of morin), at least two of them each bear two or three hydroxyl functional groups in the meta position with respect to each other or with respect to one another, it being understood that the two positions ortho to at least one of these hydroxyl functional groups are unsubstituted.

These adhesive compositions C-1.1 to C-1.7 are furthermore all based on natural rubber (NR) latex, styrene/butadiene copolymer (SBR) latex and vinylpyridine/styrene/butadiene (VP-SBR) latex.

In addition, each composition C-1.1 to C-1.7 comprises a gelatin.

These adhesive compositions were compared with a known composition C-1.0 of the state of the art comprising formaldehyde and resorcinol (in the form of a pre-condensed resin SFR 1524).

The quality of the bonding between the rubber matrix and the steel reinforcing element is determined by a test in which the force necessary to extract a steel reinforcing element, consisting of a single threadlike reinforcing element with a diameter equal to 1.75 mm, from the vulcanized rubber matrix is measured.

The following were tested:
steel reinforcing elements, the steel of the core of the threadlike reinforcing element of which is devoid of metal coating layer and comprises less than 0.5% by weight of chromium and less than 2% by weight of nickel (bare standard steel),
steel reinforcing elements, the steel of the core of the threadlike reinforcing element of which is directly coated with a layer of a metal coating. The metal of the metal coating layer is chosen from zinc, copper, tin and the alloys of these metals; in this instance, the metal is zinc (zinc-coated steel),
steel reinforcing elements, the steel of the core of the threadlike reinforcing element of which is devoid of metal coating layer and comprises at least 0.5%, limit included, preferably at least 5%, limit included, and more preferably at least 15%, limit included, by weight of chromium, in this instance 18% by weight of chromium, and at least 2%, limit included, preferably at least 4%, limit included, and more preferably at least 6% by weight of nickel, in this instance 8% by weight of nickel (bare stainless steel).

Each threadlike reinforcing element tested is devoid of nonmetallic intermediate adhesive layer.

Rubber composites comprising these coated steel reinforcing elements embedded in a rubber matrix based on a composition A comprising natural rubber, carbon black and the usual additives were tested. In the case in point, the composition A comprises 100 phr of natural rubber, 70 phr of series 300 carbon black, 1.5 phr of N-(1,3-dimethylbutyl)-N-phenyl-para-phenylenediamine, 1 phr of a cobalt salt and a crosslinking system comprising 0.9 phr of stearic acid, 6 phr of insoluble molecular sulphur, 0.8 phr of N-(tert-butyl)-2-benzothiazolesulphamide and 7.5 phr of ZnO.

Rubber composites comprising these coated steel reinforcing elements embedded in a rubber matrix based on a composition B identical to the composition A, with the exception of the content of molecular sulphur, which, in the composition B, is equal to 2.2 phr, were also tested.

The threadlike reinforcing element was coated with each adhesive composition tested. More specifically, the steel of the core (bare standard steel and stainless steel) and the metal coating layer (zinc-coated steel) were directly coated with each adhesive composition tested and then the steel reinforcing elements thus coated were dried in a drying oven at 180° C. for 30 s. The adhesive composition was then crosslinked by passing the coated steel reinforcing elements through a treatment oven at 240° C. for 30 s. Each steel reinforcing element thus coated was then embedded in each matrix based on each composition A and B, by virtue of a vulcanization heat treatment, to form test specimens of composites as described below.

More specifically, the vulcanized rubber matrix is a rubber block consisting of two sheets measuring 200 mm by 12.5 mm and with a thickness of 7 mm, applied against each other before curing (the thickness of the resulting block is then 14 mm). It is during the production of this block that the coated steel reinforcing elements (15 sections in total) are trapped between the two rubber sheets in the raw state, an equal distance apart and while leaving to protrude, on either side of these sheets, an end of the coated steel reinforcing element having a length sufficient for the subsequent tensile test. The block comprising the coated steel reinforcing elements is then placed in a suitable mould and then cured under pressure. The curing temperature and the curing time are adapted to the intended test conditions and left to the discretion of a person skilled in the art; by way of example, in the present case, the block is cured at 160° C. for 20 min.

On conclusion of the curing, the test specimen, thus consisting of the vulcanized block and the 15 sections of coated steel reinforcing elements, is placed between the jaws of a suitable tensile testing machine in order to make it possible to test each section individually, at a given rate and a given temperature (for example, in the present case, at 100 mm/min and 23° C.).

The adhesion levels are characterized by measuring the "tearing-out" force (denoted by $F_{max}$) for tearing the coated steel reinforcing elements out of the test specimen. A value greater than that for the control test specimen (corresponding to the use of the conventional RFL adhesive C-1.0 and of a rubber matrix based on the composition A), arbitrarily set at 100, indicates an improved result, that is to say, a greater tearing-out force than that for the control test specimen. The results of the tests carried out on the test specimens are summarized in Table 1. When a test was not carried out, the note "NT" for not tested has been shown.

These tests demonstrate that, for bare standard steel and zinc-coated steel, the adhesion, to a rubber matrix comprising a crosslinking system comprising a content of molecular sulphur ranging from 1 to 5 phr, of steel reinforcing elements coated with a conventional RFL adhesive has deteriorated in comparison with these same steel reinforcing elements coated with an RFL adhesive embedded in a rubber matrix comprising a crosslinking system comprising a high content of molecular sulphur.

It is also found that the steel reinforcing elements coated with the adhesive compositions C-1.1 to C-1.7 and embedded in the matrix based on the composition B exhibit an equivalent, indeed even superior, tearing-out force $F_{max}$ with respect:
to the tearing-out force $F_{max}$ of these same elements coated with the adhesive C-1.0 and embedded in the matrix based on the composition A,
to the tearing-out force $F_{max}$ of these same elements coated with the adhesive C-1.0 and embedded in the matrix based on the composition B.

Thus, satisfactory adhesion is obtained:
without, however, using a matrix of specific rubber, of halogenated polymer and of metal oxide,
while having available a rubber matrix exhibiting a relatively lengthened shelf life, in comparison with a rubber matrix based on a composition comprising a crosslinking system comprising a high content of molecular sulphur.

Among the other advantages related to the invention, it should be noted that the adhesive composition can be devoid of formaldehyde, the use of which it is desirable to reduce, indeed even eventually to eliminate, in adhesive compositions, due to the recent change in European regulations regarding this type of compound. In addition, formaldehyde is a compound derived from oil, the use of which it is desired to avoid as much as possible for reasons of increased scarcity.

The invention is not limited to the embodiments described above.

It will also be possible to envisage coating several threadlike reinforcing elements each comprising a steel core. In one embodiment, the threadlike reinforcing elements are assembled together and then the threadlike reinforcing elements are collectively coated with the adhesive composition. In another embodiment, each threadlike reinforcing element is coated individually with the adhesive composition and then the threadlike reinforcing elements are assembled together.

It will also be possible to envisage the use of coated steel reinforcing elements comprising a nonmetallic intermediate adhesive layer directly coating the steel core of the threadlike reinforcing elements or the metal coating layer, the layer of the adhesive composition then directly coating this nonmetallic intermediate adhesive layer or the metal coating layer.

TABLE 1

| Adhesive compositions | C-1.0 | C-1.1 | C-1.2 | C-1.3 | C-1.4 | C-1.5 | C-1.6 | C-1.7 |
|---|---|---|---|---|---|---|---|---|
| Aldehyde | | | | | | | | |
| 1,2-Benzenedicarboxaldehyde (1) | — | — | 0.9 | — | — | — | — | — |
| 1,3-Benzenedicarboxaldehyde (2) | — | — | — | — | 0.9 | — | — | — |
| 1,4-Benzenedicarboxaldehyde (3) | — | 0.9 | — | 0.9 | — | 0.9 | 0.9 | — |
| 2,5-Furandicarboxaldehyde (4) | — | — | — | — | — | — | — | 0.9 |
| Formaldehyde (5) | 0.71 | — | — | — | — | — | — | — |
| Polyphenol | | | | | | | | |
| Phloroglucinol (6) | — | 1.7 | — | — | — | — | — | — |
| 2,2',4,4'-Tetrahydroxydiphenyl sulphide (7) | — | — | 1.7 | 1.7 | — | — | — | — |
| Phloroglucide (8) | — | — | — | — | 1.7 | 1.7 | — | — |
| Morin (9) | — | — | — | — | — | — | 1.7 | — |
| Resorcinol (10) | — | — | — | — | — | — | — | 1.7 |
| SRF 1524 (11) | 2.05 | | | | | | | |
| Elastomer latex | | | | | | | | |
| NR (12) | 6.4 | 6.4 | 6.4 | 6.4 | 6.4 | 6.4 | 6.4 | 6.4 |
| SBR (13) | 3.2 | 3.2 | 3.2 | 3.2 | 3.2 | 3.2 | 3.2 | 3.2 |
| VP-SBR (14) | 6.4 | 6.4 | 6.4 | 6.4 | 6.4 | 6.4 | 6.4 | 6.4 |
| Additives | | | | | | | | |
| Sodium hydroxide (15) | 0.2 | 0.2 | 0.2 | 0.2 | 0.2 | 0.2 | 0.2 | 0.2 |
| Gelatin (16) | 1 | 1 | 1 | 1 | 1 | 1 | 1 | 1 |
| Aqueous ammonia (17) | 0.5 | 0.5 | 0.5 | 0.5 | 0.5 | 0.5 | 0.5 | 0.5 |
| Total weight of dry matter of adhesive composition | 19.5 | 20.3 | 20.3 | 20.3 | 20.3 | 20.3 | 20.3 | 20.3 |
| Weight of water | 80.5 | 79.7 | 79.7 | 79.7 | 79.7 | 79.7 | 79.7 | 79.7 |
| Adhesion tests - Bare standard steel | | | | | | | | |
| $F_{max}$ at 23° C. (composition A) | 100 | / | / | / | / | / | / | / |
| $F_{max}$ at 23° C. (composition B) | 15 | 98 | NT | 87 | NT | NT | NT | 91 |
| Adhesion tests - Zinc-coated steel | | | | | | | | |
| $F_{max}$ at 23° C. (composition A) | 100 | / | / | / | / | / | / | / |
| $F_{max}$ at 23° C. (composition B) | 50 | 291 | NT | 108 | NT | 122 | 97 | 231 |
| Adhesion tests - Bare stainless steel | | | | | | | | |
| $F_{max}$ at 23° C. (composition A) | 100 | / | / | / | / | / | / | / |
| $F_{max}$ at 23° C. (composition B) | 220 | 2741 | 1165 | 2110 | 1659 | 2083 | 2622 | 2080 |

(1) 1,2-Benzenedicarboxaldehyde (from ABCR; purity of 98%);
(2) 1,3-Benzenedicarboxaldehyde (from ABCR; purity of 98%);
(3) 1,4-Benzenedicarboxaldehyde (from ABCR; purity of 98%);
(4) 2,5-Furandicarboxaldehyde (from Aldrich; purity of 97%);
(5) Formaldehyde (from Caldic; diluted to 36%);
(6) Phloroglucinol (from Alfa Aesar; purity of 99%);
(7) 2,2',4,4'-Tetrahydroxydiphenyl sulphide (from Alfa Aesar; purity of 98%);
(8) Phloroglucide (from Alfa Aesar; purity of 95%);
(9) Morin (from Fluka);
(10) Resorcinol (from Sumitomo; purity of 99.5%);
(11) Pre-condensed resin SRF 1524 (from Schenectady; diluted to 75%);
(12) NR Latex ("Trang Latex" from Bee tex; diluted to 61% by weight);
(13) SBR Latex ("Encord-201" from Jubilant; diluted to 41% by weight);
(14) Vinylpyridine/styrene/butadiene latex ("VP 106S" from Eliokem; diluted to 41%);
(15) Sodium hydroxide (from Aldrich; diluted to 30%);
(16) Gelatin (gelatin from bovine skin from Aldrich);
(17) Aqueous ammonia (from Aldrich; diluted to 21%).

The invention claimed is:

1. A rubber composite reinforced with at least one steel reinforcing element coated at least in part with an adhesive layer, the reinforced rubber composite comprising a rubber matrix in which the coated steel reinforcing element is embedded, wherein the adhesive layer comprises an adhesive composition comprising at least one phenol/aldehyde resin based on at least:
    one aromatic aldehyde bearing at least one aldehyde functional group and comprising at least one aromatic nucleus; and
    one polyphenol comprising one or more aromatic nucleus/nuclei,
        wherein, if there is only one aromatic nucleus, the one aromatic nucleus bears two or three hydroxyl functional groups in the meta position with respect to each other or with respect to one another, the remainder of the aromatic nucleus being unsubstituted, and
        wherein, if there is more than one aromatic nuclei, at least two of them each bear two or three hydroxyl functional groups in the meta position with respect to each other or with respect to one another and the two positions ortho to at least one of these hydroxyl functional groups are unsubstituted,
    wherein the rubber matrix is based on a rubber composition comprising a crosslinking system comprising a content of molecular sulphur ranging from 1 to 5 phr,
    wherein the coated steel reinforcing element comprises one or more threadlike reinforcing elements, each comprising a steel core, and
    wherein the adhesive layer directly coats a layer of a metal coating directly coating at least a portion of the steel core of the or each threadlike reinforcing element such that no other layer or coating is interposed between the adhesive layer and the metal coating and no other layer or coating is interposed between the metal coating and the steel core.

2. The rubber composite according to claim 1, wherein the content of molecular sulphur of the crosslinking system of the rubber composition ranges from 1 to 4 phr.

3. The rubber composite according to claim 2, wherein the content of molecular sulphur of the crosslinking system of the rubber composition ranges from 1 to 3 phr.

4. The rubber composite according to claim 3, wherein the content of molecular sulphur of the crosslinking system of the rubber composition ranges from 1 to 2.5 phr.

5. The rubber composite according to claim 1, wherein the content of molecular sulphur of the crosslinking system of the rubber composition ranges from 1.5 to 5 phr.

6. The rubber composite according to claim 5, wherein the content of molecular sulphur of the crosslinking system of the rubber composition ranges from 2 to 5 phr.

7. The rubber composite according to claim 1, wherein the rubber composition comprises at least one diene elastomer.

8. The rubber composite according to claim 7, wherein the at least one diene elastomer is selected from the group consisting of polybutadienes, natural rubber, synthetic polyisoprenes, butadiene/styrene copolymers, isoprene/butadiene copolymers, isoprene/styrene copolymers, butadiene/styrene/isoprene copolymers and mixtures thereof.

9. The rubber composite according to claim 1, wherein the metal of the layer of the metal coating directly coating at least a portion of the steel core of the or each threadlike reinforcing element is selected from the group consisting of zinc, copper, tin and alloys thereof.

10. The rubber composite according to claim 1, wherein the aromatic aldehyde bears at least two aldehyde functional groups.

11. The rubber composite according to claim 1, wherein the at least one aromatic nucleus of the aromatic aldehyde bears two aldehyde functional groups.

12. The rubber composite according to claim 10, wherein the aromatic aldehyde is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and mixtures thereof.

13. The rubber composite according to claim 1, wherein the aromatic aldehyde is of general formula (A):

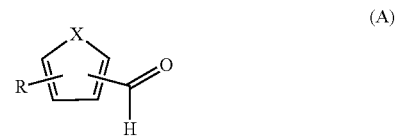

in which X comprises N, S or O, and R represents —H or —CHO.

14. The rubber composite according to claim 13, wherein the aromatic aldehyde is selected from the group consisting of furfuraldehyde, 2,5-furandicarboxaldehyde and mixtures thereof.

15. The rubber composite according to claim 1, wherein the polyphenol is selected from the group consisting of phloroglucinol, 2,2',4,4'-tetrahydroxydiphenyl sulphide and mixtures thereof.

16. The rubber composite according to claim 1, wherein the adhesive composition comprises an unsaturated elastomer latex.

17. The rubber composite according to claim 16, wherein the unsaturated elastomer of the latex is a diene elastomer.

18. The rubber composite according to claim 17, wherein the diene elastomer is selected from the group consisting of polybutadienes, butadiene copolymers, polyisoprenes, isoprene copolymers, vinylpyridine/styrene/butadiene terpolymers and mixtures thereof.

19. A process for the manufacture of a rubber composite comprising the steps of:
    coating at least a portion of a steel reinforcing element with an adhesive layer; and
    embedding the steel reinforcing element in a rubber matrix based on a rubber composition,
    wherein the adhesive layer comprises an adhesive composition comprising at least one phenol/aldehyde resin based on at least:
    one aromatic aldehyde bearing at least one aldehyde functional group and comprising at least one aromatic nucleus; and
    one polyphenol comprising one or more aromatic nucleus/nuclei,
        wherein, if there is only one aromatic nucleus, the one aromatic nucleus bears two or three hydroxyl functional groups in the meta position with respect to each other or with respect to one another, the remainder of the aromatic nucleus being unsubstituted, and
        wherein, if there is more than one aromatic nuclei, at least two of them each bear two or three hydroxyl functional groups in the meta position with respect to each other or with respect to one another and the two positions ortho to at least one of these hydroxyl functional groups is unsubstituted, wherein the rubber composition comprises a crosslinking system comprising a content of molecular sulphur ranging from 1 to 5 phr, wherein the coated steel reinforcing element comprises one or more threadlike reinforcing elements, each comprising a steel core, and wherein the adhesive layer directly coats a layer of a metal coating directly coating at least a portion of the steel core of the or each threadlike reinforcing element such that no other layer or coating is interposed between the adhesive layer and the metal coating and no other layer or coating is interposed between the metal coating and the steel core.

20. A tire comprising at least one rubber composite according to claim 1.

21. A rubber composite reinforced with at least one steel reinforcing element coated at least in part with an adhesive layer, the reinforced rubber composite comprising a rubber matrix in which the coated steel reinforcing element is embedded, wherein the adhesive layer comprises an adhesive composition comprising at least one phenol/aldehyde resin based on at least:

one aromatic aldehyde bearing at least one aldehyde functional group and comprising at least one aromatic nucleus; and one polyphenol comprising one or more aromatic nucleus/nuclei, wherein, if there is only one aromatic nucleus, the one aromatic nucleus bears two or three hydroxyl functional groups in the meta position with respect to each other or with respect to one another, the remainder of the aromatic nucleus being unsubstituted, and wherein, if there is more than one aromatic nuclei, at least two of them each bear two or three hydroxyl functional groups in the meta position with respect to each other or with respect to one another and the two positions ortho to at least one of these hydroxyl functional groups are unsubstituted, wherein the rubber matrix is based on a rubber composition comprising a crosslinking system comprising a content of molecular sulphur ranging from 1 to 5 phr, wherein the coated steel reinforcing element comprises one or more threadlike reinforcing elements, each comprising a steel core, and wherein the adhesive layer directly coats at least a portion of the steel core of the or each threadlike reinforcing element such that no other layer or coating is interposed between the adhesive layer and the steel core.

* * * * *